(12) United States Patent
Engel et al.

(10) Patent No.: US 8,179,338 B2
(45) Date of Patent: *May 15, 2012

(54) METHOD AND SYSTEM FOR DISPLAYING INFORMATION

(75) Inventors: Gabriel Daemon Engel, Hamilton (NZ); Pita Witehira, Hamilton (NZ)

(73) Assignee: IGT, Reno, NV (US)

( * ) Notice: Subject to any disclaimer, the term of this patent is extended or adjusted under 35 U.S.C. 154(b) by 258 days.

This patent is subject to a terminal disclaimer.

(21) Appl. No.: 12/765,665

(22) Filed: Apr. 22, 2010

(65) Prior Publication Data

US 2010/0201623 A1 Aug. 12, 2010

Related U.S. Application Data

(63) Continuation of application No. 10/049,272, filed on Feb. 6, 2002, now Pat. No. 7,724,208.

(30) Foreign Application Priority Data

Aug. 19, 1999 (NZ) .......................................... 337332
Aug. 18, 2000 (WO) ....................... PCT/NZ00/00160

(51) Int. Cl.
*G09G 5/00* (2006.01)
(52) U.S. Cl. ................................. 345/4; 345/6
(58) Field of Classification Search ................... 345/4, 6
See application file for complete search history.

(56) References Cited

U.S. PATENT DOCUMENTS

| | | |
|---|---|---|
| 3,863,246 A | 1/1975 | Trcka et al. |
| 4,239,349 A | 12/1980 | Scheffer |
| 4,294,516 A | 10/1981 | Brooks |
| 4,333,715 A | 6/1982 | Brooks |
| 4,371,870 A | 2/1983 | Biferno |
| 4,423,929 A | 1/1984 | Gomi |
| 4,443,062 A | 4/1984 | Togashi et al. |
| 4,472,737 A | 9/1984 | Iwasaki |
| 4,485,376 A | 11/1984 | Noble |
| 4,523,848 A | 6/1985 | Gorman et al. |
| 4,556,286 A | 12/1985 | Uchida et al. |
| 4,562,433 A | 12/1985 | Biferno |
| 4,568,928 A | 2/1986 | Biferno |
| 4,648,691 A | 3/1987 | Oguchi et al. |
| 4,649,425 A | 3/1987 | Pund |

(Continued)

FOREIGN PATENT DOCUMENTS

AU 8248298 9/1999

(Continued)

OTHER PUBLICATIONS

Translated Japanese Office Action Jul. 7, 2008—provided to show relevance of the following references: JP 49-25387, JP 52-130340, JP 58-108574, JP 58-137880, JP 60-209781, JP 62-250477.

(Continued)

*Primary Examiner* — Kevin M Nguyen
(74) *Attorney, Agent, or Firm* — Beyer Law Group LLP

(57) ABSTRACT

A display and a method of displaying information are disclosed. The display includes a first display screen including a first plurality of pixels controllable to display a visual indicator. A second display screen includes a second plurality of pixels, wherein the first and second display screens overlap, and wherein each of the first and second display screens is partially transparent. The first and second display screens are controllable to move the visual indicator from a first plane to a second plane responsive to a first user interaction with a user interface component.

42 Claims, 3 Drawing Sheets

U.S. PATENT DOCUMENTS

| | | |
|---|---|---|
| 4,712,869 A | 12/1987 | Claxton |
| 4,768,300 A | 9/1988 | Rutili |
| 4,815,742 A | 3/1989 | Augustine |
| 4,927,240 A | 5/1990 | Stolov et al. |
| 4,947,257 A | 8/1990 | Fernandez et al. |
| 5,049,870 A | 9/1991 | Fitzgerald et al. |
| 5,050,965 A | 9/1991 | Conner et al. |
| 5,091,720 A | 2/1992 | Wood |
| 5,112,121 A | 5/1992 | Chang et al. |
| 5,113,272 A | 5/1992 | Reamey |
| 5,124,803 A | 6/1992 | Troxel |
| 5,198,936 A | 3/1993 | Stringfellow |
| 5,255,028 A | 10/1993 | Biles |
| 5,255,356 A | 10/1993 | Michelman et al. |
| 5,283,560 A | 2/1994 | Bartlett |
| 5,289,297 A | 2/1994 | Bollman et al. |
| 5,317,686 A | 5/1994 | Salas et al. |
| 5,333,255 A | 7/1994 | Damouth |
| 5,361,165 A | 11/1994 | Stringfellow et al. |
| 5,367,801 A | 11/1994 | Ahn |
| 5,396,429 A | 3/1995 | Hanchett |
| 5,416,890 A | 5/1995 | Beretta |
| 5,416,895 A | 5/1995 | Anderson et al. |
| 5,418,898 A | 5/1995 | Zand et al. |
| 5,463,724 A | 10/1995 | Anderson et al. |
| 5,465,101 A | 11/1995 | Akiba et al. |
| 5,473,344 A | 12/1995 | Bacon et al. |
| 5,475,812 A | 12/1995 | Corona et al. |
| 5,479,185 A | 12/1995 | Biverot |
| 5,502,805 A | 3/1996 | Anderson et al. |
| 5,585,821 A | 12/1996 | Ishikura et al. |
| 5,590,259 A | 12/1996 | Anderson et al. |
| 5,600,462 A | 2/1997 | Suzuki et al. |
| 5,600,765 A | 2/1997 | Ando et al. |
| 5,604,854 A | 2/1997 | Glassey |
| 5,623,591 A | 4/1997 | Cseri |
| 5,638,501 A | 6/1997 | Gough et al. |
| 5,648,789 A | 7/1997 | Beadles et al. |
| 5,651,107 A | 7/1997 | Frank et al. |
| 5,663,746 A | 9/1997 | Pellenberg et al. |
| 5,664,127 A | 9/1997 | Anderson et al. |
| 5,675,755 A | 10/1997 | Trueblood |
| 5,694,150 A | 12/1997 | Sigona et al. |
| 5,694,532 A | 12/1997 | Carey et al. |
| 5,695,346 A | 12/1997 | Sekiguchi et al. |
| 5,721,847 A | 2/1998 | Johnson |
| 5,757,522 A | 5/1998 | Kulick et al. |
| 5,764,317 A | 6/1998 | Sadovnik et al. |
| 5,772,446 A | 6/1998 | Rosen |
| 5,796,455 A | 8/1998 | Mizobata et al. |
| 5,805,163 A | 9/1998 | Bagnas |
| 5,805,171 A | 9/1998 | St. Clair et al. |
| 5,813,742 A | 9/1998 | Gold et al. |
| 5,825,436 A | 10/1998 | Knight |
| 5,828,420 A | 10/1998 | Marshall et al. |
| 5,831,615 A | 11/1998 | Drews et al. |
| 5,835,088 A | 11/1998 | Jaaskelainen, Jr. |
| 5,880,742 A | 3/1999 | Rao et al. |
| 5,883,623 A | 3/1999 | Cseri |
| 5,883,627 A | 3/1999 | Pleyer |
| 5,883,635 A | 3/1999 | Rao et al. |
| 5,890,174 A | 3/1999 | Khanna et al. |
| 5,923,307 A | 7/1999 | Hogle, IV |
| 5,924,870 A | 7/1999 | Brosh et al. |
| 5,999,191 A | 12/1999 | Frank et al. |
| 6,005,654 A | 12/1999 | Kipfer et al. |
| 6,016,385 A | 1/2000 | Yee et al. |
| 6,018,379 A | 1/2000 | Mizobata et al. |
| 6,031,530 A | 2/2000 | Trueblood |
| 6,037,937 A | 3/2000 | Beaton et al. |
| 6,057,814 A | 5/2000 | Kalt |
| 6,061,110 A | 5/2000 | Hisatake et al. |
| 6,072,489 A | 6/2000 | Gough et al. |
| 6,075,531 A | 6/2000 | DeStefano |
| 6,085,202 A | 7/2000 | Rao et al. |
| 6,097,361 A | 8/2000 | Rohner |
| 6,100,862 A | 8/2000 | Sullivan |
| 6,111,614 A | 8/2000 | Mugura et al. |
| 6,118,427 A | 9/2000 | Buxton et al. |
| 6,163,318 A | 12/2000 | Fukuda et al. |
| 6,181,349 B1 | 1/2001 | Bardon et al. |
| 6,204,902 B1 | 3/2001 | Kim et al. |
| 6,215,490 B1 | 4/2001 | Kaply |
| 6,215,898 B1 | 4/2001 | Woodfill et al. |
| 6,239,852 B1 | 5/2001 | Oono et al. |
| 6,246,407 B1 | 6/2001 | Wilks et al. |
| 6,269,173 B1 | 7/2001 | Hsien |
| 6,282,551 B1 | 8/2001 | Anderson et al. |
| 6,300,990 B1 | 10/2001 | Yamaguchi et al. |
| 6,317,128 B1 | 11/2001 | Harrison et al. |
| 6,327,592 B1 | 12/2001 | Yoshikawa |
| 6,341,439 B1 | 1/2002 | Lennerstad |
| 6,351,298 B1 | 2/2002 | Mitsui et al. |
| 6,356,281 B1 | 3/2002 | Isenman |
| 6,369,830 B1 | 4/2002 | Brunner et al. |
| 6,377,229 B1 | 4/2002 | Sullivan |
| 6,418,426 B1 | 7/2002 | Schlesinger |
| 6,438,515 B1 | 8/2002 | Crawford et al. |
| 6,443,579 B1 | 9/2002 | Myers |
| 6,466,185 B2 | 10/2002 | Sullivan et al. |
| 6,468,157 B1 | 10/2002 | Hinami et al. |
| 6,496,832 B2 | 12/2002 | Chi et al. |
| 6,505,209 B1 | 1/2003 | Gould et al. |
| 6,525,699 B1 | 2/2003 | Suyama et al. |
| 6,538,660 B1 | 3/2003 | Celi, Jr. et al. |
| 6,587,094 B2 | 7/2003 | Anderson |
| 6,587,118 B1 | 7/2003 | Yoneda |
| 6,593,904 B1 | 7/2003 | Marz et al. |
| 6,609,799 B1 | 8/2003 | Myers |
| 6,610,102 B1 | 8/2003 | Aldred et al. |
| 6,661,425 B1 | 12/2003 | Hiroaki |
| 6,693,692 B1 | 2/2004 | Kaneko et al. |
| 6,721,713 B1 | 4/2004 | Guheen et al. |
| 6,725,422 B1 | 4/2004 | Bauchot et al. |
| 6,760,003 B1 | 7/2004 | Sase |
| 6,771,327 B2 | 8/2004 | Sekiguchi |
| 6,845,578 B1 | 1/2005 | Lucas |
| 6,859,907 B1 | 2/2005 | McGarry |
| 2001/0026625 A1 | 10/2001 | Azima et al. |
| 2002/0067373 A1 | 6/2002 | Roe et al. |
| 2002/0091728 A1 | 7/2002 | Kjaer et al. |
| 2002/0093516 A1 | 7/2002 | Brunner et al. |
| 2002/0163728 A1 | 11/2002 | Myers |
| 2002/0163729 A1 | 11/2002 | Myers |
| 2003/0069074 A1 | 4/2003 | Jackson |
| 2003/0132895 A1 | 7/2003 | Berstis |
| 2003/0184665 A1 | 10/2003 | Berstis |
| 2004/0239582 A1 | 12/2004 | Seymour |

FOREIGN PATENT DOCUMENTS

| | | |
|---|---|---|
| AU | 2480600 | 7/2000 |
| AU | 2453800 | 8/2000 |
| AU | 6821901 | 12/2001 |
| BE | 1011678 | 12/1999 |
| CA | 2009960 | 9/1990 |
| CA | 2075807 | 8/1991 |
| CA | 2320694 | 8/1999 |
| CN | 1293805 | 5/2001 |
| CN | 1294695 | 5/2001 |
| DE | 2730785 | 1/1979 |
| DE | 29912074 | 11/1999 |
| DE | 19920789 | 5/2000 |
| EP | 0389123 | 9/1990 |
| EP | 454423 | 10/1991 |
| EP | 595387 | 5/1994 |
| EP | 0703563 | 3/1996 |
| EP | 0802684 | 10/1997 |
| EP | 0935191 | 8/1999 |
| EP | 0999088 | 5/2000 |
| EP | 1057070 | 12/2000 |
| EP | 1093008 | 4/2001 |
| EP | 1151430 | 11/2001 |
| EP | 1177527 | 2/2002 |
| EP | 1287401 | 3/2003 |
| GB | 2145897 | 4/1985 |
| GB | 2312584 | 10/1997 |
| GB | 2347003 | 8/2000 |

| | | |
|---|---|---|
| GB | 2372618 | 8/2002 |
| JP | 61248083 | 11/1986 |
| JP | 62-235929 | 10/1987 |
| JP | 63-65795 | 3/1988 |
| JP | 63-100898 | 5/1988 |
| JP | 63158587 | 7/1988 |
| JP | 1-229591 | 9/1989 |
| JP | 2-90127 | 3/1990 |
| JP | 2-146087 | 6/1990 |
| JP | 3-021902 | 1/1991 |
| JP | 3075963 | 3/1991 |
| JP | 3-174580 | 7/1991 |
| JP | 3186894 | 8/1991 |
| JP | 3-226095 | 10/1991 |
| JP | 3282586 | 12/1991 |
| JP | 4-191755 | 7/1992 |
| JP | 4220691 | 8/1992 |
| JP | 6-274305 | 9/1994 |
| JP | 6-314181 | 11/1994 |
| JP | 6317488 | 11/1994 |
| JP | 63-39299 | 12/1994 |
| JP | 7-44349 | 2/1995 |
| JP | 8-30243 | 2/1996 |
| JP | 08-036375 | 2/1996 |
| JP | 8-83160 | 3/1996 |
| JP | 8095741 | 4/1996 |
| JP | 09-033858 | 2/1997 |
| JP | 9146751 | 6/1997 |
| JP | 9-230825 | 9/1997 |
| JP | 09-282357 | 10/1997 |
| JP | 9-308769 | 12/1997 |
| JP | 10003355 | 1/1998 |
| JP | 10039782 | 2/1998 |
| JP | 10039821 | 2/1998 |
| JP | 10105829 | 4/1998 |
| JP | 10228347 | 8/1998 |
| JP | 10-260784 | 9/1998 |
| JP | 10-334275 | 12/1998 |
| JP | 11205822 | 7/1999 |
| JP | 2000-142173 | 5/2000 |
| JP | 2000-347645 | 12/2000 |
| JP | 2001-56675 | 2/2001 |
| JP | 2001-215332 | 8/2001 |
| JP | 2000-99237 | 10/2001 |
| JP | 2002-099223 | 4/2002 |
| JP | 2002-350772 | 12/2002 |
| JP | 2002544544 | 12/2002 |
| JP | 2003507774 | 2/2003 |
| NL | 1005868 | 10/1997 |
| NO | 20005178 | 4/2001 |
| PL | 343229 | 4/2001 |
| WO | 91/12554 | 8/1991 |
| WO | 96/27992 | 9/1996 |
| WO | 98/47106 | 10/1998 |
| WO | 99/42889 | 8/1999 |
| WO | 00/36578 | 6/2000 |
| WO | 00/48167 | 8/2000 |
| WO | 00/68887 | 11/2000 |
| WO | 01/01290 | 1/2001 |
| WO | 01/15127 | 3/2001 |
| WO | 01/15128 | 3/2001 |
| WO | 01/95019 | 12/2001 |
| WO | 02/35277 | 5/2002 |
| WO | 02/084637 | 10/2002 |
| WO | 02/091033 | 11/2002 |
| WO | 03/003109 | 1/2003 |
| ZA | 9703025 | 11/1997 |

OTHER PUBLICATIONS

Final Office Action Dated Apr. 15, 2010; U.S. Appl. No. 10/557,157.
Non-Final Office Action Dated Jun. 1, 2010; U.S. Appl. No. 10/476,590.
Final Office Action Dated Jun. 25, 2010; U.S. Appl. No. 12/107,589.
Clearboard 1991-1994, http://web.media.mit.edu/~ishii/CB.html, pp. 1-3, 1994.
"Teamworkstation 1989-1994," http://web.media.mit.edu/~ishii/TWS.html, pp. 1-4, 1994.
"TEXTARC: An Alternate Way to View a Text," http://textarc.org, p. 1, 2002.
"TEXTARC: NYSCA Grant and Public Installation," http"//textarc.org, p. 1, 2002.
"TEXTARC: The Print and the Artist," http://textarc.org, p. 1, 2002.
Courter et al., Microsoft Office 2000 Professional Edition, Sybex Inc., pp. xxxi, 543, 685, 1999.
Harrison et al., "Transparent Layered User Interfaces: An Evaluation of a Display Design to Enhance Focused and Divided Attention" ACM, pp. 1-13 pp. 1995.
Ishii et al., "Iterative Design of Seamless Collaboration Media", Communications of the ACM, vol. 37, pp. 83-97, 1994.
"Display", http://web.archive.org/web/20010717132509/http://whatis.techtarget.com/definition/0,,sid9_gci211965,00.html, Jul. 27, 2000.
Non Final Office Action; U.S. Appl. No. 10/048,638; Mail Date: Jun. 6, 2007.
Non Final Office Action; U.S. Appl. No. 10/048,638; Mail Date: Jun. 6, 2008.
Non Final Office Action; U.S. Appl. No. 10/048,638; Mail Date: Jun. 26, 2006.
Final Office Action; U.S. Appl. No. 10/476,590; Mail Date: Oct. 16, 2007.
Final Office Action; U.S. Appl. No. 10/048,638; Mail Date: Oct. 17, 2005.
Final Office Action; U.S. Appl. No. 10/048,638; Mail Date: Nov. 27, 2007.
Advisory Action; U.S. Appl. No. 10/048,966; Mail Date: Jan. 12, 2006.
Non Final Office Action; U.S. Appl. No. 10/048,966; Mail Date: Jan. 27, 2005.
Final Office Action; U.S. Appl. No. 10/476,590; Mail Date: Oct. 6, 2006.
Final Office Action; U.S. Appl. No. 10/048,966; Mail Date: May 2, 2007.
Final Office Action; U.S. Appl. No. 10/476,590; Mail Date: Jun. 19, 2008.
Final Office Action; U.S. Appl. No. 10/048,966; Mail Date: Jul. 14, 2005.
Non Final Office Action; U.S. Appl. No. 10/048,966; Mail Date: Aug. 18, 2006.
Non Final Office Action; U.S. Appl. No. 10/048,966; Mail Date: Sep. 18, 2007.
Non Final Office Action; U.S. Appl. No. 10/476,590; Mail Date: Oct. 29, 2008.
Non Final Office Action; U.S. Appl. No. 10/049,271; Mail Date Feb. 5, 2008.
Non Final Office Action; U.S. Appl. No. 10/049,271; Mail Date Feb. 8, 2006.
Final Office Action; U.S. Appl. No. 10/049,271; Mail Date May 18, 2005.
Final Office Action; U.S. Appl. No. 10/049,271; Mail Date Aug. 5, 2008.
Final Office Action; U.S. Appl. No. 10/049,271; Mail Date: Aug. 23, 2006.
Non Final Office Action; U.S. Appl. No. 10/049,271; Mail Date: Nov. 17, 2004.
Final Office Action; U.S. Appl. No. 10/049,272; Mail Date: Jan. 23, 2006.
Final Office Action; U.S. Appl. No. 10/049,272; Mail Date: Mar. 25, 2008.
Final Office Action; U.S. Appl. No. 10/049,272; Mail Date: May 21, 2007.
Non Final Office Action; U.S. Appl. No. 10/476,590; Mail Date: Apr. 19, 2007.
Non Final Office Action; U.S. Appl. No. 10/049,272; Mail Date: Jul. 13, 2005.
Final Office Action; U.S. Appl. No. 10/049,272; Mail Date: Jul. 26, 2004.
Non Final Office Action; U.S. Appl. No. 10/049,272; Mail Date: Aug. 13, 2008.
Non Final Office Action; U.S. Appl. No. 10/049,272; Mail Date: Aug. 28, 2006.

Non Final Office Action; U.S. Appl. No. 10/049,272; Mail Date: Oct. 12, 2007.
Advisory Action Office Action; U.S. Appl. No. 10/049,272; Mail Date: Nov. 29, 2004.
Non Final Office Action; U.S. Appl. No. 10/476,590; Mail Date: Mar. 3, 2006.
Final Office Action; U.S. Appl. No. 10/049,272; Mail Date: Dec. 24, 2008.
Non Final Office Action; U.S. Appl. No. 10/049,272; Mail Date: Dec. 31, 2003.
Non Final Office Action; U.S. Appl. No. 10/476,590; Mail Date: Feb. 28, 2008.
Non Final Office Action; U.S. Appl. No. 12/107,589; Mail Date: Feb. 16, 2010.
Non Final Office Action; U.S. Appl. No. 10/489,101; Mail Date: Mar. 29, 2006.
Final Office Action; U.S. Appl. No. 10/476,590; Mail Date: Feb. 26, 2010.
Non Final Office Action; U.S. Appl. No. 10/489,101; Mail Date: Jul. 28, 2005.
Final Office Action; U.S. Appl. No. 10/489,101; Mail Date: Nov. 22, 2005.
Non Final Office Action; U.S. Appl. No. 101476,590; Mail Date Sep. 4, 2009.
Final Office Action; U.S. Appl. No. 10/528,334; Mail Date: Feb. 24, 2009.
Non Final Office Action; U.S. Appl. No. 10/528,334; Mail Date: Aug. 5, 2008.
Final Office Action; U.S. Appl. No. 10/048,966; Mail Date: Mar. 18, 2009.
Final Office Action; U.S. Appl. No. 10/476,590; Mail Date: Mar. 23, 2009.
Non Final Office Action; U.S. Appl. No. 10/049,272; Mail Date: Aug. 14, 2009.
Non Final Office Action; U.S. Appl. No. 10/528,334; Mail Date: Sep. 1, 2009.
Non Final Office Action; U.S. Appl. No. 12/107,589; Mail Date: Aug. 12, 2009.
Non Final Office Action; U.S. Appl. No. 10/557,157, Mail Date: Sep. 9, 2009.
Non-Final Office Action Mailed Sep. 13, 2010; U.S. Appl. No. 12/606,728.
Non-Final Office Action Mailed Oct. 22, 2010; U.S. Appl. No. 12/107,589.
Non-Final Office Action Mailed Oct. 12, 2010; U.S. Appl. No. 10/557,157.

METHOD AND SYSTEM FOR DISPLAYING INFORMATION

RELATED APPLICATIONS

The present application is a continuation of U.S. patent application Ser. No. 10/049,272, filed Feb. 6, 2002, naming Gabriel D. Engel and Pita Witehira as inventors, assigned to the assignee of the present invention, which is a National Stage Application filed under 35 U.S.C. §371 of International Patent Application Number PCT/NZ00/00160, filed Aug. 18, 2000, which claims the benefit of New Zealand Patent Number 337332, filed Aug. 19, 1999. Each of these applications is incorporated herein by reference in their entirety and for all purposes.

BACKGROUND OF THE INVENTION

Particularly, the present invention relates to a visual display system including multi-level screens which are spaced physically apart in a layered configuration. For example, such screens are described in PCT Application Nos. PCT/NZ98/00098 and PCT/NZ99/00021.

These devices are created by combining multiple layers of selectively transparent screens. Each screen is capable of showing an image. In preferred embodiments the screen layers are liquid crystal display. Preferably the screens are aligned parallel to each other with a pre-set distance between them.

With this device images displayed on the screen furthest from view (background screen) will appear at some distance behind the images displayed on the screen closer to the viewer (foreground screen). The transparent portions in the foreground screen will allow viewers to see images displayed on the background screen. This arrangement using multiple screens allows images to be presented at multiple levels to give the viewer true depth without the use of glass or lens.

Up until now, software has been written to create visual sequences on the multi-level screens. These sequences have been mainly passive, mainly for viewing rather than for interaction. While the visual effect of these sequences is spectacular, it will be desirable if potential uses of a multi-level screen display could be explored further.

It is an object of the present invention to address this problem, or at least to provide the public with a useful choice. Aspects of the present invention will now be described by way of example only with reference to the following description.

SUMMARY OF THE INVENTION

According to one aspect of the present invention there is provided a visual display system including multiple screens spaced physically apart in a layered configuration, wherein each screen has a two-dimensional plane, a visual indicator, an input device, a user selectable input, the visual display system being characterized in that the user can use the user selectable input to move the visual indicator via the input device out of the two-dimensional plane of a particular screen.

According to another aspect of the present invention there is provided a method of using a visual display system which has multiple screens spaced physically apart in a layered configuration, wherein each screen has a two-dimensional plane, the visual display system also including a visual indicator, an input device, a user selectable input, the method characterized by the step of the user using the selectable input to move the visual indicator out of the two-dimensional plane of a particular screen and on to another screen and on to another screen.

One aspect of the present invention there is provided media containing instructions for the operation of visual display system as described.

In preferred embodiments of the present invention the multi-level screens are similar to that described in PCT Application Nos. PCT/NZ98/00098 and PCT/NZ99/00021, although this should not be seen as limiting.

The term two-dimensional plane refers to the effective viewing plane on a particular screen, similar to that seen on a normal display screen.

The visual indicator may be any type of indicator, for example a cursor, image, icon or screen image. It is envisaged that the visual indicator is something which can move in response to the user of the system via some input mechanism.

The input device may be any suitable input device, for example a mouse, tablet data glove, keyboard, touch screen, joystick, trackball, pen, stylus, touch pad, voice and so forth.

The user selectable input is preferably an input the user can make to effect the operation of software running the display device via the input device. For example, if the input device is a mouse, then the user selectable input may be a mouse button. If the input device is a joystick, then the user selectable input may be the trigger. If the user input is a keyboard, then the user selectable input may be arrow keys. And so forth.

We envisage that the present invention could be used extensively by those in the graphics industry. Therefore one embodiment in the present invention is envisaged that by having the input device as a pen or stylus, the present invention could be utilized in these industries to its fullest.

In some embodiments, the user selectable input may actually be a software button on a touch screen that may be independent of the input device. This allows standard input devices and drivers to be used without modification.

In further embodiments of the present invention, the input device shall be referred to as a mouse and the user selectable input shall be referred to as a mouse button. The mouse button may be an existing button on the mouse, or in some embodiments may be a dedicated button for use with the present invention. This should not be seen as limiting.

The visual indicator shall now be referred to as a cursor, although this should not be seen as limiting. The user can use a mouse to move a cursor around a display screen as can be achieved with usual software. However, with one embodiment of the present invention, the user can then click a particular mouse button to cause the visual indicator to move from one screen to another screen. In one embodiment the applicant uses the centre button or a configurable button on a three button mouse, but this should not be seen as limiting.

In one embodiment, the software controlling the cursor position is supplemental to usual mouse drives. Therefore a program can run as usual with standard mouse drive commands but the cursor position between screens can change as a consequence of the interaction of the supplemental program responding to the additional input from the mouse.

This ability enables the user to actually interact with different screens and work on separate screens in terms of having an input device which can interact with whichever screen has been selected. The advantages of this feature are self apparent.

In some embodiments, the movement from the two-dimensional plane of one screen to another screen may be discrete and it may appear that the visual indicator merely jumps from one screen to the other and be at the same x-y coordinate with the only change being in the z axis.

In other embodiments, there may be more of a linear movement perceived as a consequence of the movement from one screen to the other. For example, the present invention may be used in conjunction with a drawing package. The person drawing may start drawing on the front screen of the visual device using the mouse and cursor.

The person then may wish to take advantage of the three dimensional quality allowed by the present invention and effectively draw in the z axis (the x and y axis having already been drawn in on the two-dimensional screen). This may be achieved by the user clicking the mouse button and dragging the cursor effectively so it appears to pass from one screen to the other screen with an image (say a line) appearing to provide a visual bridge between the front screen and another screen or screens in the background.

In other embodiments of the present invention this ability may be used with particular total screen images. For example, the present invention may be used with an interactive game which gives the impression that the user is moving deep within a scene. For example, the user may be flying a craft in the game and as the user moves forward in the game, the images may pass from the background screen or screens to the foreground screen giving the illusion of full movement. In this embodiment the visual indicator may be the images and the input device a joy-stick.

Aspects of the present invention will now be described with reference to the following drawings which are given by way of example only.

BRIEF DESCRIPTION OF THE DRAWINGS

Further aspects of the present invention will become apparent from the following description which is given by way of example only and with reference to the accompanying drawings.

DETAILED DESCRIPTION OF THE INVENTION

Figure 1A:
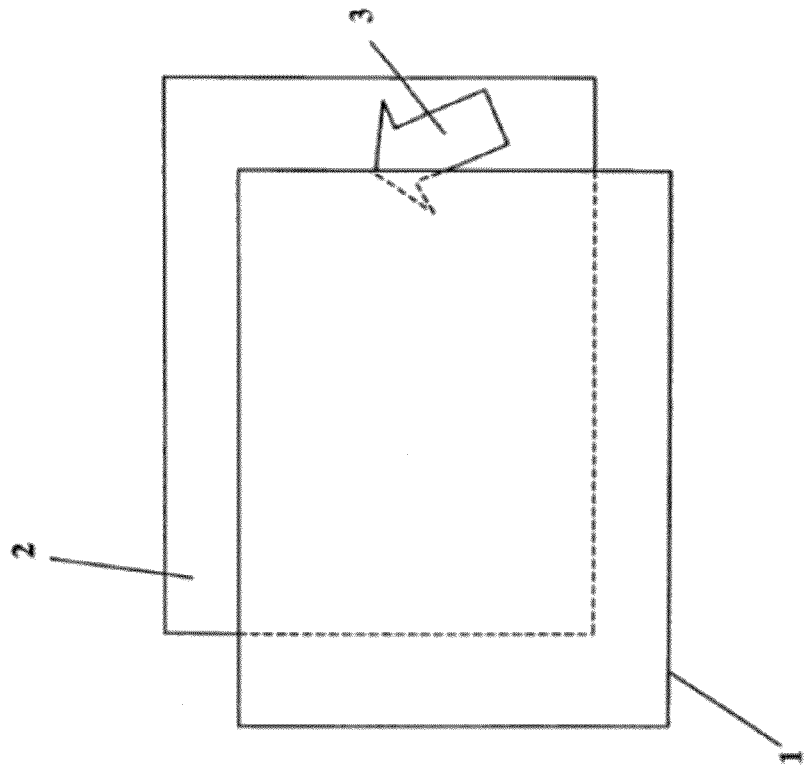
FIG. 1 illustrates one embodiment of the present invention.
Figure 1B:
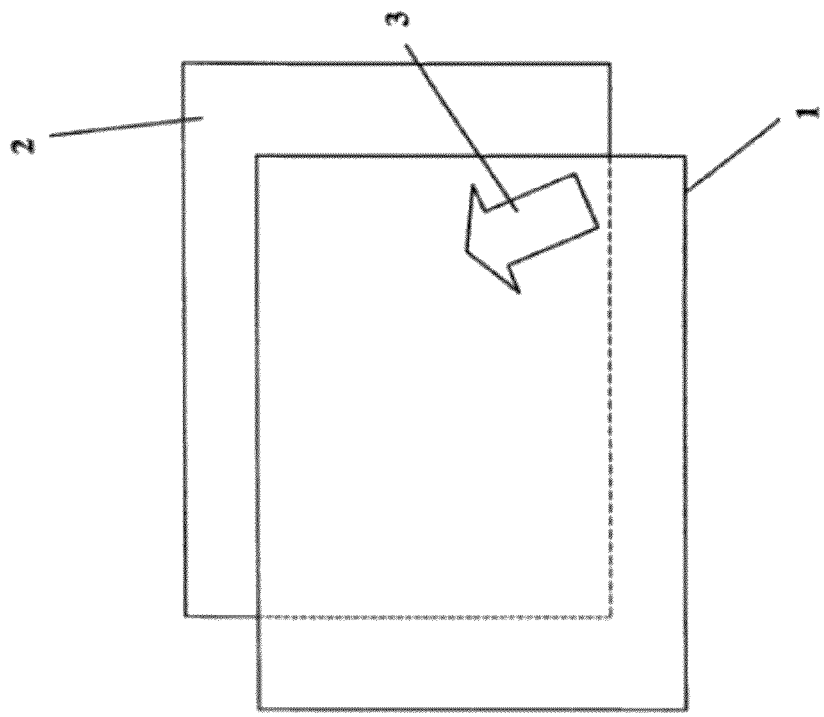

FIGS. 1a and 1b illustrate a stylized version of one embodiment of the present invention at work. These figures have foreground screens 1 and background screens 2.

It should be appreciated that the reference to just two screens is by way of example only and the present invention may work in relation to multiple numbers of screens.

FIG. 1a shows the positioning of the visual indicator 3 in the form of a cursor arrow on the front foreground screen 1. In this embodiment of the present invention a simple click of a mouse button causes the cursor 3 to appear in exactly the same x y coordinates as on the foreground screen 1, but positioned on the background screen 2. Thus, in this embodiment, the user selectable input merely does a direct transpose in the z axis between screens.

Figure 2B:
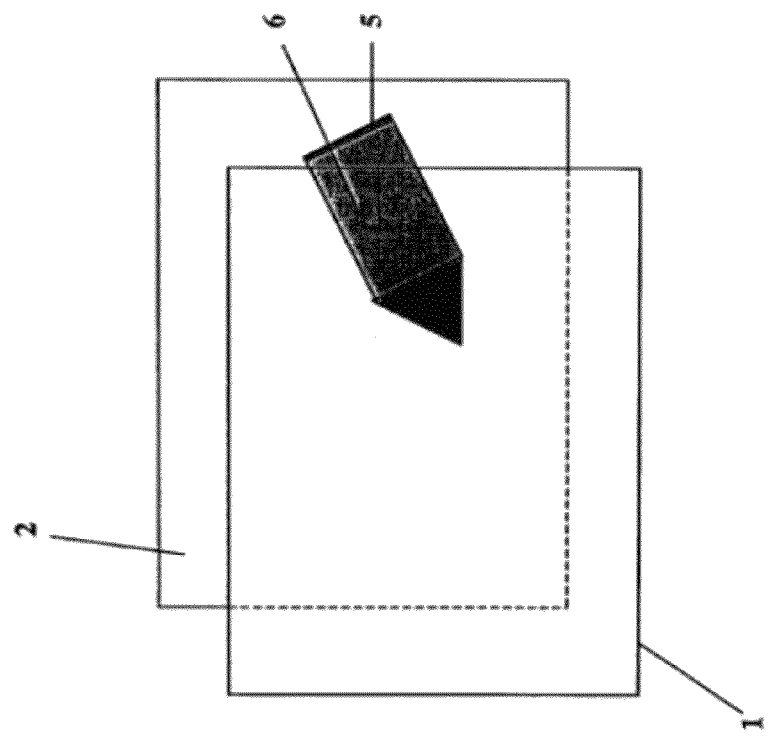
FIG. 2 illustrates a second embodiment of the present invention.
Figure 2A:
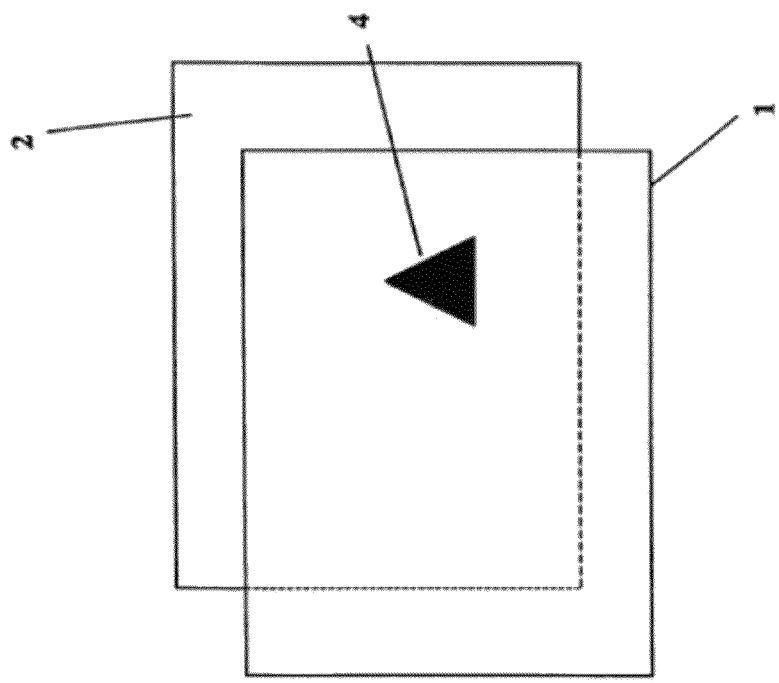

FIG. 2 likewise has a foreground screen 1 and a background screen 2. In FIG. 2a, a triangle 4 has been drawn on the x y two-dimensional plane of the foreground screen 1.

In FIG. 2b, to give the triangle 4 depth, the user has selected and dragged the image in the x y direction to give not only the image of a triangle 5 on the background screen 2, but also a plane in the z axis 6 for finding a solid-looking representation.

As the screens are physically quite separate, the illusion of the solid wall 6 is accomplished by sophisticated software shading techniques.

Figure 3B:
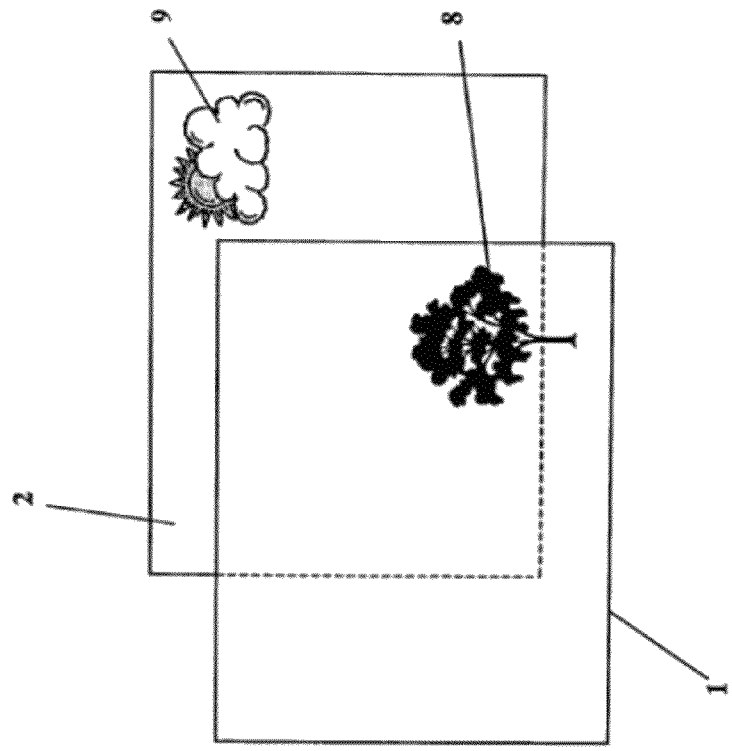
FIG. 3 illustrates a third embodiment of the present invention.
Figure 3A:
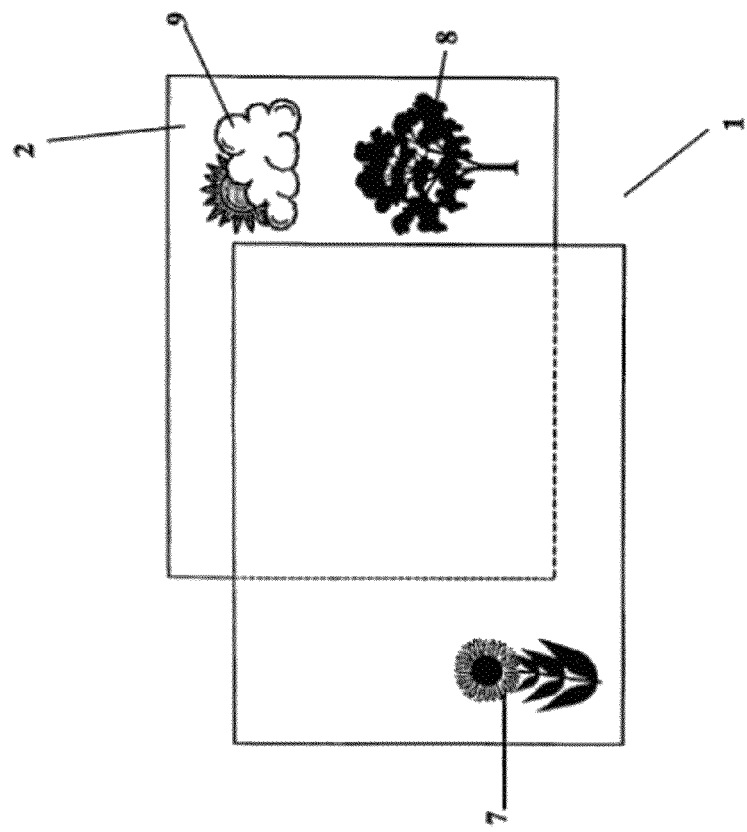

FIG. 3 again has a foreground screen 1 and background screen 2. This embodiment of the present invention can be used for moving through three-dimensional landscapes. For example, as shown in FIG. 3a, flower 7 is positioned on the foreground screen 1, while tree 8 and cloud 9 are positioned on the background screen 2.

The user may then use the input device to effectively move through the scene visually. This causes the flower depicted in FIG. 3a to disappear from the foreground screen 1 as shown in FIG. 3b. This also causes the tree 8 to move from the background screen 2 to the foreground screen 1. The cloud 9 being in the far background stays on the background screen 2. Thus it can be seen that the present invention allows considerable amount of interaction between the user and the screens.

Aspects of the present invention have been described by way of example only and it should be appreciated that modifications and additions may be made thereto without departing from the scope of the appended claims.

What is claimed is:

1. A display comprising:
   a first display screen comprising a first plurality of pixels controllable to display a visual indicator; and
   a second display screen comprising a second plurality of pixels, wherein said first and second display screens overlap, and wherein each of said first and second display screens is partially transparent, and
   wherein said first and second display screens are controllable to move said visual indicator from a first plane to a second plane responsive to a first user interaction with a user interface component.

2. The display of claim 1, wherein said first plane corresponds to said first display screen.

3. The display of claim 1, wherein said second plane corresponds to said second display screen.

4. The display of claim 1, wherein said user interface component is selected from a group consisting of a cursor-directing device, a keyboard, a joystick, and a tablet data glove.

5. The display of claim 1, wherein said user interface component comprises a button of a cursor-directing device.

6. The display of claim 1, wherein said user interface component is selected from a group consisting of a touchscreen and a touch pad.

7. The display of claim 1, wherein said user interface component is selected from a group consisting of a pen and a stylus.

8. The display of claim 1, wherein said user interface component is voice-activated.

9. The display of claim 1, wherein said first and second display screens are further controllable to move said visual indicator from a first position on said second plane to a second position on said second plane responsive to a second user interaction with said user interface component.

10. The display of claim 9, wherein said first and second display screens are further controllable to move said visual indicator from said first position to said second position after movement of said visual indicator from said first plane to said second plane.

11. The display of claim 1, wherein said visual indicator is selected from a group consisting of an icon, a cursor, an image and a screen image.

12. The display of claim 1, wherein rendering of said visual indicator is controlled by an application selected from a group consisting of a gaming application, a drawing application and a graphical application.

13. The display of claim 1, wherein said first and second plurality of pixels overlap.

14. The display of claim 1, wherein said first and second display screens are further controllable to display an image between said visual indicator on said first plane and said visual indicator on said second plane.

15. A method of displaying information comprising:
displaying a visual indicator using a first plurality of pixels of a first display screen of said display, wherein said display further comprises a second display screen, wherein said first and second display screens overlap, wherein each of said first and second display screens is partially transparent, and wherein said second display screen comprises a second plurality of pixels;
detecting a first user interaction with a user interface component; and
responsive to said detecting said first user interaction, controlling said first and second display screens to move said visual indicator from a first plane to a second plane.

16. The method of claim 15, wherein said first plane corresponds to said first display screen.

17. The method of claim 15, wherein said second plane corresponds to said second display screen.

18. The method of claim 15, wherein said user interface component is selected from a group consisting of a cursor-directing device, a keyboard, a joystick, and a tablet data glove.

19. The method of claim 15, wherein said user interface component comprises a button of a cursor-directing device.

20. The method of claim 15, wherein said user interface component is selected from a group consisting of a touchscreen and a touch pad.

21. The method of claim 15, wherein said user interface component is selected from a group consisting of a pen and a stylus.

22. The method of claim 15, wherein said user interface component is voice-activated.

23. The method of claim 15 further comprising:
responsive to a second user interaction with said user interface component, controlling said first and second display screens to move said visual indicator from a first position on said second plane to a second position on said second plane.

24. The method of claim 23, wherein said controlling said first and second display screens to move said visual indicator from said first position to said second position further comprises controlling said first and second display screens to move said visual indicator from said first position to said second position after movement of said visual indicator from said first plane to said second plane.

25. The method of claim 15, wherein said visual indicator is selected from a group consisting of an icon, a cursor, an image and a screen image.

26. The method of claim 15, wherein rendering of said visual indicator is controlled by an application selected from a group consisting of a gaming application, a drawing application and a graphical application.

27. The method of claim 15, wherein said first and second plurality of pixels overlap.

28. The method of claim 15 further comprising:
controlling said first and second display screens to display an image between said visual indicator on said first plane and said visual indicator on said second plane.

29. A computer-readable medium having computer-readable program code embodied therein for causing a computer system to perform a method of displaying information, said method comprising:
displaying a visual indicator using a first plurality of pixels of a first display screen of said display, wherein said display further comprises a second display screen, wherein said first and second display screens overlap, wherein each of said first and second display screens is partially transparent, and wherein said second display screen comprises a second plurality of pixels;
detecting a first user interaction with a user interface component; and
responsive to said detecting said first user interaction, controlling said first and second display screens to move said visual indicator from a first plane to a second plane.

30. The computer-readable medium of claim 29, wherein said first plane corresponds to said first display screen.

31. The computer-readable medium of claim 29, wherein said second plane corresponds to said second display screen.

32. The computer-readable medium of claim 29, wherein said user interface component is selected from a group consisting of a cursor-directing device, a keyboard, a joystick, and a tablet data glove.

33. The computer-readable medium of claim 29, wherein said user interface component comprises a button of a cursor-directing device.

34. The computer-readable medium of claim 29, wherein said user interface component is selected from a group consisting of a touchscreen and a touch pad.

35. The computer-readable medium of claim 29, wherein said user interface component is selected from a group consisting of a pen and a stylus.

36. The computer-readable medium of claim 29, wherein said user interface component is voice-activated.

37. The computer-readable medium of claim 29 further comprising:
responsive to a second user interaction with said user interface component, controlling said first and second display screens to move said visual indicator from a first position on said second plane to a second position on said second plane.

38. The computer-readable medium of claim 37, wherein said controlling said first and second display screens to move said visual indicator from said first position to said second position further comprises controlling said first and second display screens to move said visual indicator from said first position to said second position after movement of said visual indicator from said first plane to said second plane.

39. The computer-readable medium of claim 29, wherein said visual indicator is selected from a group consisting of an icon, a cursor, an image and a screen image.

40. The computer-readable medium of claim 29, wherein rendering of said visual indicator is controlled by an application selected from a group consisting of a gaming application, a drawing application and a graphical application.

41. The computer-readable medium of claim 29, wherein said first and second plurality of pixels overlap.

42. The computer-readable medium of claim 29, wherein said method further comprises:
controlling said first and second display screens to display an image between said visual indicator on said first plane and said visual indicator on said second plane.

* * * * *